(12) United States Patent
Bar-Sade et al.

(10) Patent No.: US 10,790,898 B1
(45) Date of Patent: Sep. 29, 2020

(54) BASE STATION ALTITUDE AUTOMATIC ADJUSTMENT FOR REMOTE WIRELESS NETWORK OPTIMIZATION

(71) Applicants: Idan Bar-Sade, Sunnyvale, CA (US); Robert Michael Reagan, Morgan Hill, CA (US)

(72) Inventors: Idan Bar-Sade, Sunnyvale, CA (US); Robert Michael Reagan, Morgan Hill, CA (US)

(73) Assignee: RTO Wireless, LLC

( * ) Notice: Subject to any disclaimer, the term of this patent is extended or adjusted under 35 U.S.C. 154(b) by 0 days.

(21) Appl. No.: 16/811,647

(22) Filed: Mar. 6, 2020

Related U.S. Application Data

(60) Provisional application No. 62/814,705, filed on Mar. 6, 2019.

(51) Int. Cl.
| | | |
|---|---|---|
| *H04W 4/00* | (2018.01) | |
| *H04B 7/185* | (2006.01) | |
| *H04W 84/06* | (2009.01) | |
| *H04W 84/18* | (2009.01) | |
| *H01Q 1/24* | (2006.01) | |
| *H04W 16/26* | (2009.01) | |
| *H04W 88/08* | (2009.01) | |

(52) U.S. Cl.
CPC ......... *H04B 7/18506* (2013.01); *H01Q 1/246* (2013.01); *H04B 7/18504* (2013.01); *H04W 16/26* (2013.01); *H04W 84/06* (2013.01); *H04W 84/18* (2013.01); *H04W 88/08* (2013.01)

(58) Field of Classification Search
CPC ....... H04W 4/90; H04W 64/00; H04W 76/50; H04W 88/06; H04W 16/28; H04W 28/04; H04W 4/027; H04W 4/029; H04W 84/18; H04W 88/02
USPC ........................ 455/431, 127.1, 456.2, 456.1
See application file for complete search history.

(56) References Cited

U.S. PATENT DOCUMENTS

| | | | |
|---|---|---|---|
| 2004/0253951 A1* | 12/2004 | Chang ................. | H04W 84/005 455/431 |
| 2006/0009262 A1* | 1/2006 | Hamm ............... | H04B 7/18506 455/561 |
| 2009/0098850 A1* | 4/2009 | Deaton ................ | H04Q 3/0079 455/404.1 |
| 2013/0090126 A1 | 4/2013 | Xing et al. | |
| 2015/0011227 A1 | 1/2015 | Wellington | |

(Continued)

*Primary Examiner* — Joseph Arevalo
(74) *Attorney, Agent, or Firm* — QuickPatents, LLC; Kevin Prince (57) ABSTRACT

A system of optimizing communications of a plurality of wireless mobile units over a ground coverage area includes a plurality of airborne wireless base stations each fixed over a designated portion of the ground coverage area. Each base station can be raised or lowered in in accordance with communications needs of the wireless mobile units registered with each base station. Each base station has at least one antenna that provides a coverage cone below the wireless base station and results in the designated coverage area having a ground size dependent upon altitude. A controller is adapted to receive parameters relating to the communications between the wireless mobile units and the wireless base stations and to determine a desired altitude for each of the wireless base stations to optimize the communications.

7 Claims, 5 Drawing Sheets

(56) References Cited

U.S. PATENT DOCUMENTS

2019/0115974 A1* 4/2019 Frolov ............... H04B 7/18504
2020/0028569 A1* 1/2020 Ghosh .................. H04W 24/08

* cited by examiner

| Aerostat Elevation Ft | Cell Radius Miles | Coverage Area Sqr Miles |
|---|---|---|
| 500 | 10 Miles | 314 |
| 1000 | 16 Miles | 804 |
| 1500 | 21 Miles | 1385 |
| 2000 | 28 Miles | 2463 |
| 2500 | 40 Miles | 5027 |

FIG. 5

BASE STATION ALTITUDE AUTOMATIC ADJUSTMENT FOR REMOTE WIRELESS NETWORK OPTIMIZATION

CROSS-REFERENCE TO RELATED APPLICATIONS

This application claims the benefit of U.S. Provisional Patent Application 62/814,705, filed on Mar. 6, 2019, and incorporated herein by reference.

STATEMENT REGARDING FEDERALLY SPONSORED RESEARCH AND DEVELOPMENT

Not Applicable.

FIELD OF THE INVENTION

This invention relates to wireless cellular and data network optimization, and more particularly to a Self-Organizing Network of airborne wireless base stations.

BACKGROUND

A wireless base station, such as cellular phone tower or the like, if located on a fixed structure, has the drawback that a coverage area of the base station is geographically fixed. As such, new base stations must be installed in geographically precise areas in order to extend coverage to wider areas or to handle more subscribers in the existing area.

Therefore, there is a need for a system that can dynamically broaden or narrow the coverage area of a base station, and that can move adjacent base stations in a way to extend their coverage areas when a maximum subscriber capacity has been reached on a first base station. Such a needed system would be relatively easy to deploy, manage, and rearrange as needed. The present invention accomplishes these objectives.

SUMMARY OF THE INVENTION

The present device is a system of optimizing communications of a plurality of wireless mobile units over a ground coverage area. The wireless mobile units, for example, are mobile cellular phones. A plurality of airborne wireless base stations, such as blimps or aerostats, are each fixed over a designated portion of the ground coverage area. Each wireless base station is adapted to be raised or lowered in altitude, such as with a winch mechanism, in in accordance with communications needs of the wireless mobile units within the designated portion of the ground coverage area.

Each wireless base station has at least one antenna that provides a coverage cone below the wireless base station and results in the designated coverage area having a ground size dependent upon the altitude of the wireless base station. As such, mobile units outside of the designated coverage area of the wireless base station are not able to communicate with the wireless base station, and those mobile units within the designated coverage area are able to communicate with the wireless base station. Each wireless mobile unit within the designated coverage area of one of the wireless base stations is registered by the wireless base station and two-way wireless communication therebetween is established. Each wireless base station has a maximum capacity of registered mobile units.

A controller is adapted to receive parameters relating to the communications between the wireless mobile units and the wireless base stations. The controller also receives altitude data for each of the wireless base stations. The controller is adapted to perform calculations to determine a desired altitude for each of the wireless base stations and to command each wireless base station to move to the desired altitude.

If the number of mobile units within the designated coverage area of the first base station exceeds the capacity of the first base station, then the first base station can be lowered until the designated coverage area only encompasses a number of mobile units lower than the capacity of the base station. Simultaneously, adjacent base stations may be raised in altitude so that their designated coverage areas extend into the areas previously covered by the first base station but that are no longer in the designated coverage area of the first base station. In this manner all of the ground coverage area can be covered while balancing the load of the mobile units within the ground coverage area across the plurality of wireless base stations.

The designated coverage areas of adjacent wireless base stations overlap each other in an overlapping area when the wireless base stations are above a non-overlapping altitude. Such an overlapping area may be desirable when a relatively large number of the mobile units are congregated in a common area, such as a sporting arena, shopping mall, or the like.

In use, with each wireless base station airborne and registering any of the mobile units within its designated coverage area, the controller obtains voice quality data and connection speed data between each mobile unit and the one or more of the wireless base stations to which the mobile unit is registered. The control may also obtain from each of the wireless base stations the capacity of the base station and the number of wireless mobile units registered therewith. The control then determines an optimal altitude or altitude range for each base station over the ground coverage area based on one or more parameters such as the voice quality data, connection speed data, the capacity of the base stations, and the number of wireless mobile units registered with each of the base station. The controller then issues appropriate altitude commands for each base station, the winch mechanism of each base station either reeling-out the tether to raise the base station or reeling-in the tether to lower the base station.

If any of the parameters change by a predetermined threshold, such as 10% for example, the controller recalculates the optimal altitude or altitude range for each base station and the process repeats.

The present invention is a system that can dynamically broaden or narrow the coverage area of the wireless base station. The present system can move adjacent base stations in a way to extend their coverage areas when a maximum registered mobile unit, or subscriber, capacity has been reached on a first base station. The present invention is relatively easy to deploy, manage, and rearrange as needed. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
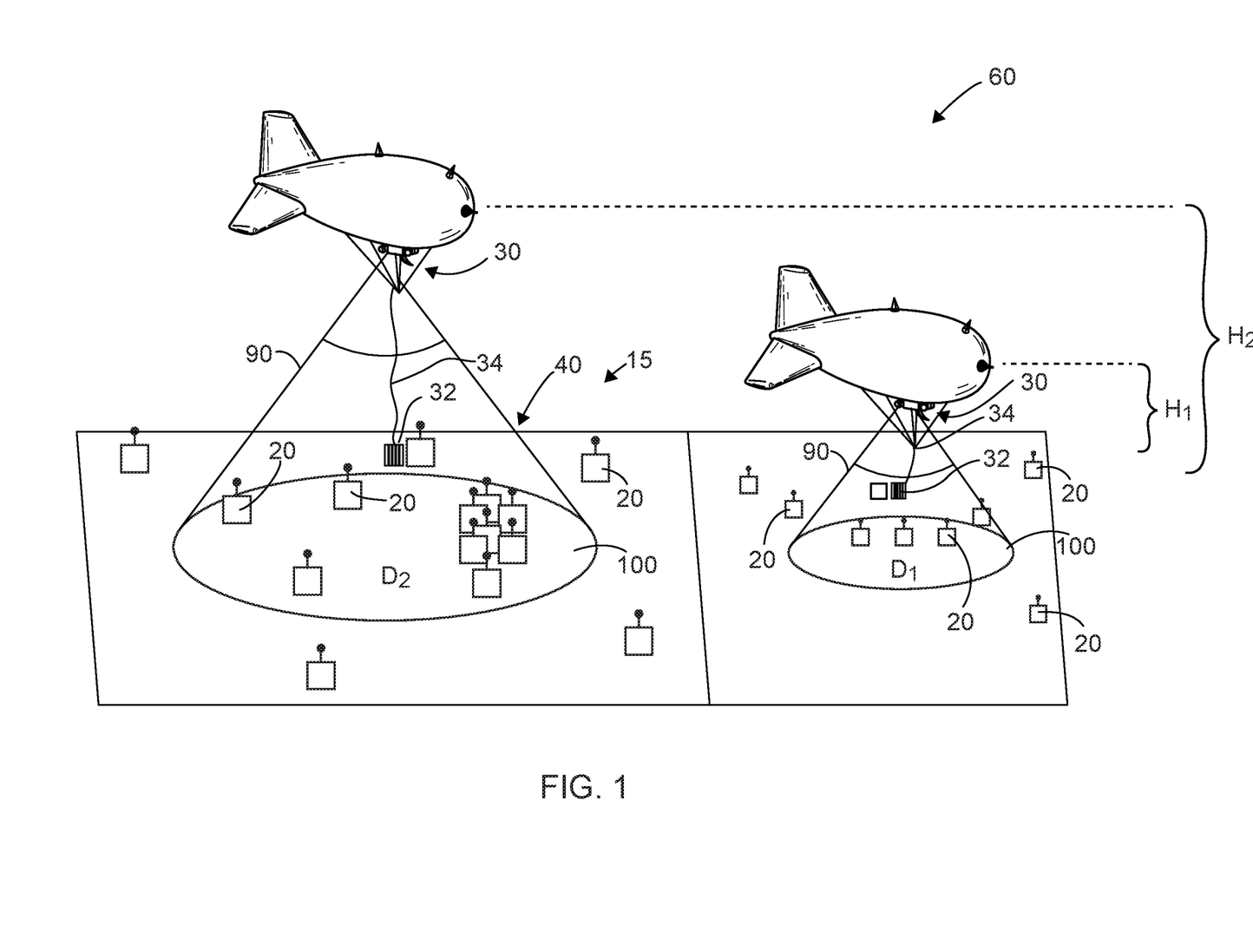
FIG. 1 is a perspective diagram of the invention.
Figure 2:
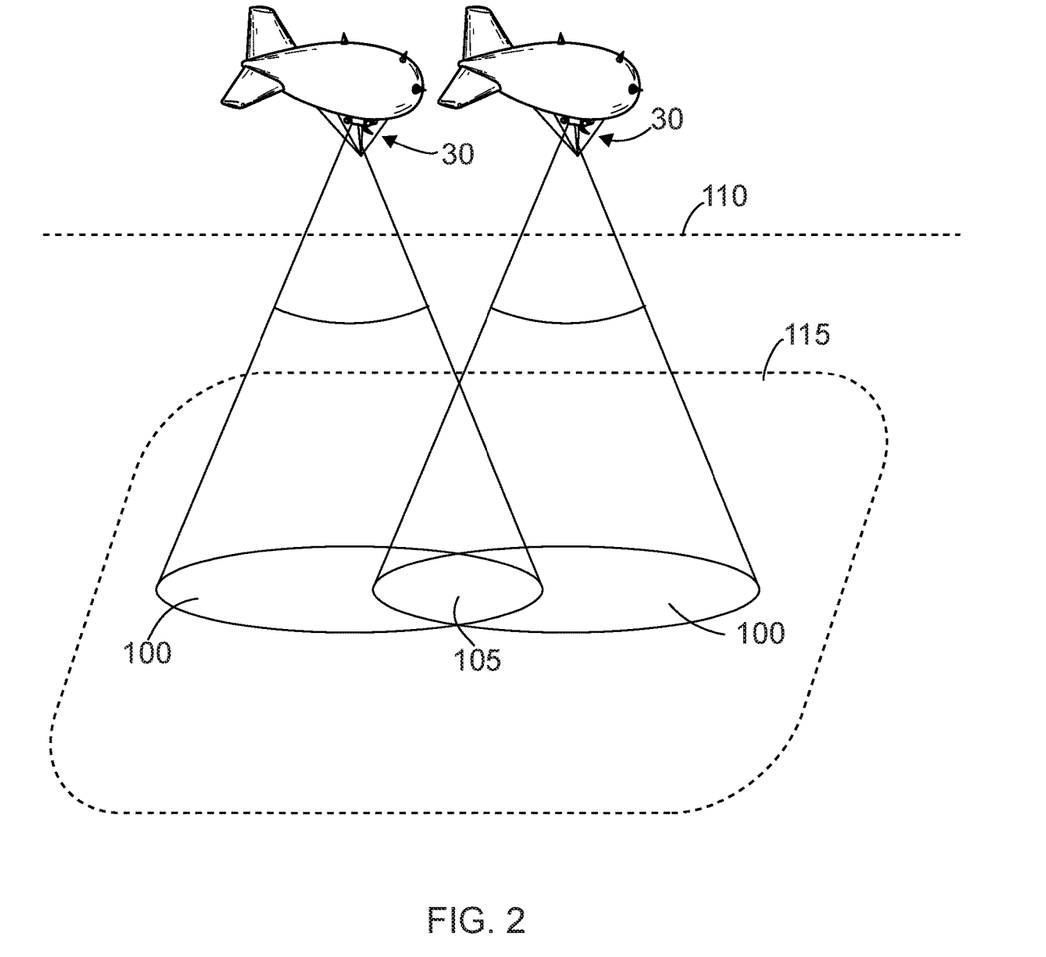
FIG. 2 is a perspective diagram showing overlapping coverage areas of two aerial wireless base stations.

FIGS. 1 and 2 illustrate a system 10 of optimizing communications of a plurality of wireless mobile units 20 over a ground coverage area 15. The wireless mobile units 20, for example, are mobile cellular phones.

A plurality of airborne wireless base stations 30 are each fixed over a designated portion 40 of the ground coverage area 15. Each wireless base station 30 is adapted to be raised or lowered in altitude, preferably with a winch mechanism 32 adapted to reel-out a tether 34 between the winch mechanism 32 and the base station 30, or to reel-the tether 34 to lower the altitude of the base station 30, in in accordance with communications needs of the wireless mobile units 20 within the designated portion 40 of the ground coverage area 15. The wireless base stations 30 are each preferably lighter-than-air aerostats having a payload frame (not shown) that includes wireless communication equipment, environmental air conditioning equipment, antennas 31, a power source for the equipment, and the like.

Each wireless base station 30 has at least one antenna 31 that provides a coverage cone 90 below the wireless base station 30 and results in the designated coverage area 100 having a ground size $D_x$ dependent upon the altitude of the wireless base station 30. As such, mobile units 20 outside of the designated coverage area 100 of the wireless base station 30 are not able to communicate with the wireless base station 30, and those mobile units 20 within the designated coverage area 100 are able to communicate with the wireless base station 30. Each wireless mobile unit 20 within the designated coverage area 100 of one of the wireless base stations 30 is registered by the wireless base station 30 and two-way wireless communication therebetween is established. Each wireless base station 30 has a maximum capacity of registered mobile units 20.

A controller is adapted to receive parameters 60 relating to the communications between the wireless mobile units 20 and the wireless base stations 30. The controller 50 also receives altitude data 70 for each of the wireless base stations 30. The controller 50 is adapted to perform calculations to determine a desired altitude for each of the wireless base stations 30 and to command each wireless base station 30 to move to the desired altitude.

Figure 5:
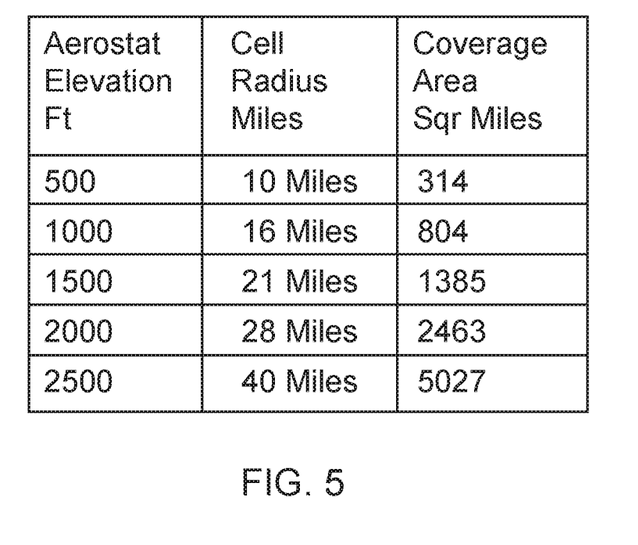
FIG. 5 is a data table showing sample coverage sizes based on base station altitudes.

For example, a first wireless base station 30 may be set at an altitude of 1000 feet (FIG. 1), resulting in a designated coverage area 100 having a radius of 16 miles, wherein $D_1$ is 804 square miles. A second wireless base station 30 may be set at an altitude of 500 feet, resulting in a designated coverage area 100 having a radius of 10 miles, wherein $D_x$ is 314 square miles.

If the number of mobile units 20 within the designated coverage area 100 of the first base station 30 exceeds the capacity of the first base station 30, then the first base station 30 can be lowered until the designated coverage area 100 only encompasses a number of mobile units lower than the capacity of the base station 30. Simultaneously, adjacent base stations 30 may be raised in altitude so that their designated coverage areas 100 extend into the areas previously covered by the first base station 30 but that are no longer in the designated coverage area 100 of the first base station 30. In this manner all of the ground coverage area 15 can be covered while balancing the load of the mobile units 20 within the ground coverage area 15 across the plurality of wireless base stations 30.

The designated coverage areas 100 of adjacent wireless base stations 30 overlap each other in an overlapping area 105 when the wireless base stations 30 are above a non-overlapping altitude 110 (FIG. 2). Such an overlapping area 105 may be desirable when a relatively large number of the mobile units 20 are congregated in a common area, such as a sporting arena, shopping mall, or the like.

Figure 3:
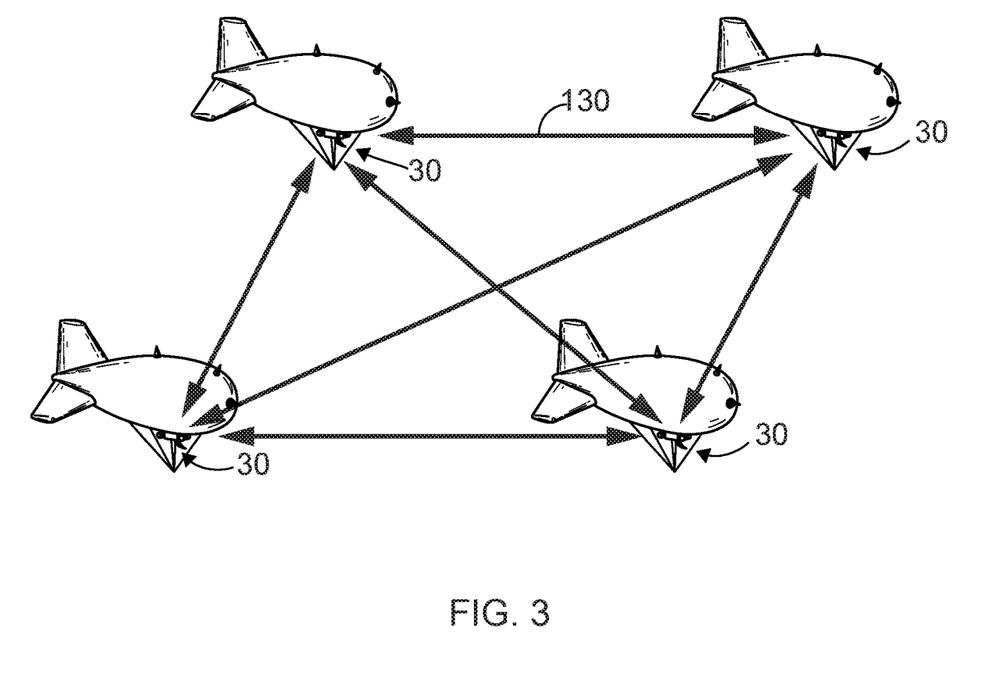
FIG. 3 is a perspective diagram of a plurality of the wireless base stations forming a backhaul mesh network.

Preferably each wireless base station 30 communicates with at least one other of the wireless base stations 30 via a backhaul mesh network 130 (FIG. 3) between the wireless base stations 30.

Figure 4:
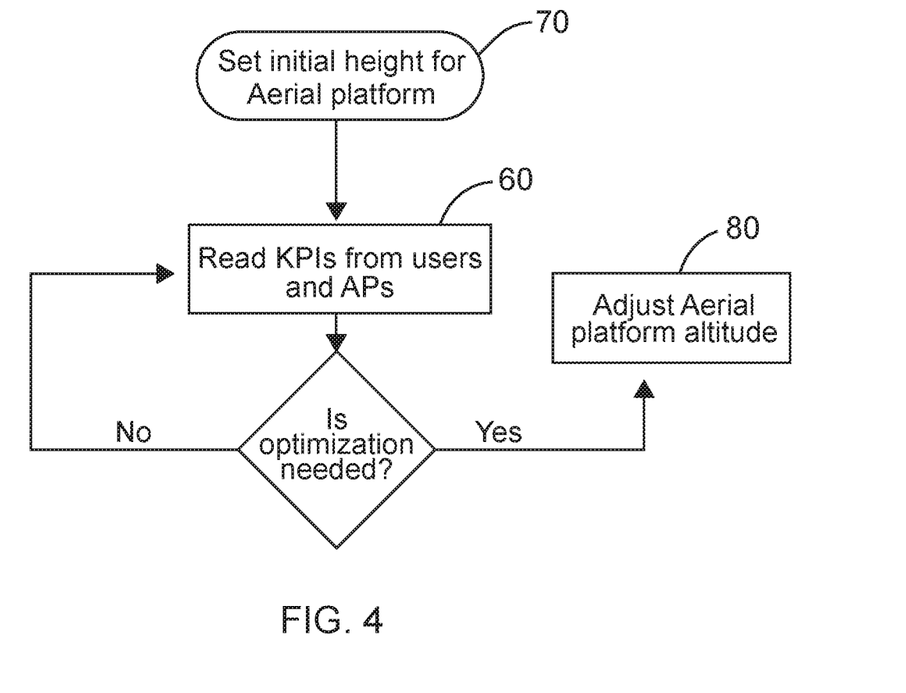
FIG. 4 is a flow chart showing how the invention optimizes base station altitudes.

In use, with each wireless base station 30 airborne and registering any of the mobile units 20 within its designated coverage area 100, the controller 50 obtains voice quality data and connection speed data between each mobile unit 20 and the one or more of the wireless base stations 30 to which the mobile unit 20 is registered. The control 50 may also obtain from each of the wireless base stations 30 the capacity of the base station 30 and the number of wireless mobile units 20 registered therewith. The control 50 then determines an optimal altitude or altitude range for each base station 30 over the ground coverage area 15 based on one or more parameters such as the voice quality data, connection speed data, the capacity of the base stations 30, and the number of wireless mobile units 20 registered with each of the base station 30. The controller 50 then issues appropriate altitude commands for each base station 30, the winch mechanism 32 of each base station 30 either reeling-out the tether 34 to raise the base station 30 or reeling-in the tether 34 to lower the base station 30.

If any of the parameters change by a predetermined threshold, such as 10% for example, the controller 50 recalculates the optimal altitude or altitude range for each base station 30 and the process repeats.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system of optimizing communications of a plurality of wireless mobile units over a ground coverage area, comprising:
   a plurality of airborne wireless base stations each fixed over a designated portion of the ground coverage area and each adapted to be raised or lowered in altitude in accordance with communications needs of the wireless mobile units within the ground coverage area, each airborne wireless base station including a winch mechanism and a tether adapted to reel-out the tether to raise the altitude of the base station, or to reel-in the tether to lower the altitude of the base station; and
   a controller adapted to receive parameters relating to the communications between the wireless mobile units and the wireless base stations, and altitude data for each of the wireless base stations, the controller further adapted to perform calculations to determine a desired altitude for each of the wireless base stations and to command each wireless base station to move to the desired altitude, each wireless base station communicating with at least one other of the wireless base stations via a backhaul mesh network between the wireless base stations;
   each wireless base station further including at least one antenna that provides a coverage cone below the base station and results in the designated coverage area having a ground size dependent upon the altitude of the base station, wherein mobile units outside of the designated coverage area of the base station are unable to communication with the base station, and those within the designated coverage area are able to communication with the base station;
   wherein each wireless mobile unit within the designated coverage area of one of the base station is registered by the base station and two-way wireless communication therebetween is established, each base station having a maximum capacity of registered mobile units;
   whereby the designated coverage areas of adjacent base stations overlap each other when the base stations are above a non-overlapping altitude, and the designated coverage areas of adjacent base stations do not overlap when the base stations are each below the non-overlapping altitude.

2. The system of claim 1 wherein each airborne wireless base station includes a winch mechanism and a tether adapted to reel-out the tether to raise the altitude of the base station, or to reel-in the tether to lower the altitude of the base station.

3. The system of claim 1 wherein each wireless base station has at least one antenna that provides a coverage cone below the base station and results in the designated coverage area having a ground size dependent upon the altitude of the base station, wherein mobile units outside of the designated coverage area of the base station are not able to communication with the base station, and those within the designated coverage area are able to communication with the base station.

4. The system of claim 3 wherein the designated coverage areas of adjacent base stations overlap each other when the base stations are above a non-overlapping altitude.

5. The system of claim 1 wherein each wireless mobile unit within the designated coverage area of one of the base station is registered by the base station and two-way wireless communication there between is established, each base station having a maximum capacity of registered mobile units.

6. The system of claim 1 wherein each wireless base station communicates with at least one other of the wireless base stations via a backhaul mesh network between the wireless base stations.

7. A method of optimizing communications between a plurality of wireless mobile units and a network of multiple airborne wireless base stations over a ground coverage area, comprising the steps:

a) providing a plurality of airborne wireless base stations each fixed over a designated portion of the ground coverage area and each adapted to be raised or lowered in altitude in accordance with communications needs of the wireless mobile units within the ground coverage area, each airborne wireless base station including a winch mechanism and a tether adapted to reel-out the tether to raise the altitude of the base station, or to reel-in the tether to lower the altitude of the base station, each wireless base station further including at least one antenna that provides a coverage cone below the base station and results in the designated coverage area having a ground size dependent upon the altitude of the base station; and a controller adapted to receive parameters relating to the communications between the wireless mobile units and the wireless base stations, and altitude data for each of the wireless base stations, the controller further adapted to perform calculations to determine a desired altitude for each of the wireless base stations and to command each wireless base station to move to the desired altitude, each wireless base station communicating with at least one other of the wireless base stations via a backhaul mesh network between the wireless base stations; wherein mobile units outside of the designated coverage area of the base station are unable to communication with the base station, and those within the designated coverage area are able to communication with the base station; and wherein each wireless mobile unit within the designated coverage area of one of the base station is registered by the base station and two-way wireless communication there between is established, each base station having a maximum capacity of registered mobile units; whereby the designated coverage areas of adjacent base stations overlap each other when the base stations are above a non-overlapping altitude, and the designated coverage areas of adjacent base stations do not overlap when the base stations are each below the non-overlapping altitude;

b) each base station registering any of the mobile units within its designated coverage area;

c) the controller obtaining voice quality data and connection speed data between each mobile unit and the one or more base station to which the mobile unit is registered;

d) the controller obtaining coverage data and mobile unit density data from the base stations;

e) the controller obtaining from each base stations the capacity of the base station and the number of wireless mobile units registered with the base station;

f) the controller determining an optimal altitude for each base station over the ground coverage area based on one or more parameters including those determined in step c), step d) and/or step e);

g) repeating from step c) when the number of mobile units changes by ten-percent or more, or if the voice quality data or connection speed data changes by more than 10%, or if the mobile unit density changes by more than 10%.

* * * * *